US011314288B2

(12) United States Patent
Goh et al.

(10) Patent No.: US 11,314,288 B2
(45) Date of Patent: Apr. 26, 2022

(54) PORTABLE INFORMATION HANDLING SYSTEM STYLUS DOCK

(71) Applicant: Dell Products L.P., Round Rock, TX (US)

(72) Inventors: Eid-Beng Goh, Taipei (TW); Justin Cole Lyles, Austin, TX (US); Jihun Yeom, Seoul (KR); An-Chung Hsieh, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 88 days.

(21) Appl. No.: 16/205,658

(22) Filed: Nov. 30, 2018

(65) Prior Publication Data

US 2020/0174529 A1 Jun. 4, 2020

(51) Int. Cl.
*G06F 1/16* (2006.01)
*G06F 3/041* (2006.01)
*G06F 3/0354* (2013.01)

(52) U.S. Cl.
CPC .......... *G06F 1/1681* (2013.01); *G06F 1/1616* (2013.01); *G06F 1/1618* (2013.01); *G06F 1/1643* (2013.01); *G06F 3/03545* (2013.01); *G06F 3/0416* (2013.01)

(58) Field of Classification Search
None
See application file for complete search history.

(56) References Cited

U.S. PATENT DOCUMENTS

| 6,865,075 | B2 * | 3/2005 | Oakley | G06F 1/1618 345/173 |
| 2005/0090206 | A1 * | 4/2005 | Hyun | G06F 1/1688 455/90.3 |
| 2011/0102979 | A1 * | 5/2011 | Jinkinson | G06F 1/1616 361/679.01 |
| 2013/0152342 | A1 * | 6/2013 | Ahn | F16C 11/04 16/354 |
| 2014/0029183 | A1 | 1/2014 | Ashcraft et al. | |
| 2014/0055427 | A1 * | 2/2014 | Kim | G06F 3/0488 345/179 |
| 2014/0078116 | A1 | 3/2014 | Mercea et al. | |
| 2014/0253464 | A1 * | 9/2014 | Hicks | G06F 3/0488 345/173 |
| 2014/0255899 | A1 * | 9/2014 | Poullain | G09B 9/08 434/351 |
| 2015/0253923 | A1 * | 9/2015 | Cho | G06F 3/0488 345/173 |
| 2015/0378455 | A1 * | 12/2015 | Immel | H02J 7/0042 345/179 |
| 2017/0222456 | A1 | 8/2017 | Perez et al. | |
| 2017/0235337 | A1 * | 8/2017 | Vic | E05D 11/00 361/679.55 |

(Continued)

*Primary Examiner* — Benjamin C Lee
*Assistant Examiner* — Emily J Frank
(74) *Attorney, Agent, or Firm* — Zagorin Cave LLP; Robert W. Holland

(57) ABSTRACT

Portable information handling system housing portions rotationally couple with a mono barrel hinge that integrates a stylus garage in a barrel element coupling hinge elements at opposing ends. The stylus garage is formed as a depression within the barrel element that captures a stylus so that the housing portions enclose the stylus when rotated to a closed position and expose the stylus when rotated to an open position.

13 Claims, 4 Drawing Sheets

(56) References Cited

U.S. PATENT DOCUMENTS

| | | | |
|---|---|---|---|
| 2017/0267898 A1* | 9/2017 | Singla | G06F 3/03545 |
| 2017/0356225 A1* | 12/2017 | Maatta | E05D 1/04 |
| 2018/0107254 A1* | 4/2018 | Godfrey | G06F 1/1681 |
| 2018/0324964 A1* | 11/2018 | Yoo | H05K 1/189 |
| 2019/0029135 A1* | 1/2019 | Park | H04M 1/022 |
| 2020/0089360 A1* | 3/2020 | Sen | G06F 3/04886 |
| 2020/0241602 A1* | 7/2020 | Ku | E05D 11/08 |

* cited by examiner

PORTABLE INFORMATION HANDLING SYSTEM STYLUS DOCK

BACKGROUND OF THE INVENTION

Field of the Invention

The present invention relates in general to the field of portable information handling system input devices, and more particularly to a portable information handling system stylus dock.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems generally have processing components, input/output (I/O) devices and a battery integrated in a portable housing to enable operations free from external resources. End users tend to rely upon portable information handling systems to perform processing tasks when traveling away from an enterprise or home office, such as during business meetings or airplane flights. To enhance portability, end users generally prefer small and light weight information handling systems. Generally, the size and weight of a portable information handling system is a tradeoff between portability and processing capabilities. Typically portable information handling system width and length are driven by the surface area of a flat panel display integrated in the system. Generally, system height is driven by the size and capabilities of processing components disposed in the housing. Reduced system height tends to decrease system weight and improve system portability with decreased system capability driven by reduced space for processing components and active thermal management, such as a cooling fan.

Often portable information handling systems have plural portions rotationally coupled to each other to improve portability. For example, a convertible information handling system typically includes a lid portion that integrates a display and a main portion that integrates processing components and a keyboard. Convertible information handling systems convert from a closed configuration having the lid and display closed against the keyboard to a clamshell configuration having the lid and display rotated ninety degrees relative to the main portion so that the display is held in a viewing position over the keyboard. In some systems, the lid rotates 360 degrees relative to the main portion to hold the display in a tablet mode. The tablet mode provides a convenient configuration for consuming data, such as reading a web page or email. In the tablet mode, the end user performs inputs with touches at the display.

One tool that improves end user interactions in the tablet mode is a stylus that acts as a pen to write on a touchscreen display. For example, a stylus has an active capacitive touch point that a touchscreen display detects to interpret handwritten inputs. The end user experience is similar to writing by hand on paper with the inputs converted to digital form and stored at the information handling system. The stylus active capacitive input point aids in accurate touch inputs at the touchscreen display for reliable translation of inputs into data.

One difficulty with using a stylus at a touchscreen display is ensuring that the stylus is readily available when desired by an end user. An end user can make touch inputs with a finger trace, however, the stylus active tip provides greater accuracy and reliability. Generally, stylus devices are coupled to an information handling system to prevent loss. In some instances, stylus devices are slid into an opening of the information handling system housing or a carrier of the information handling system. Another technique for stowing a stylus is to include magnets in the stylus that attract to ferromagnetic material integrated in the information handling system. These techniques help to keep a stylus available at an information handling system and ready for use, however, the stylus is sometimes in the way or inconveniently held.

SUMMARY OF THE INVENTION

Therefore, a need has arisen for a system and method which securely holds a stylus at a portable information handling system.

In accordance with the present invention, a system and method are provided which substantially reduce the disadvantages and problems associated with previous methods and systems to hold a stylus at a portable information handling system. A mono barrel hinge rotationally coupling portable information handling system lid and main portions includes a depression that stows a stylus. The depression is formed in a barrel element that couples together hinge elements and aligns so that the stylus stows within the housing portions in a closed position and exposes for use in an open position.

More specifically, a portable information handling system rotationally couples a lid housing portion having an integrated display with a main housing portion integrating processing components and a keyboard. A mono barrel hinge rotationally couples the lid and main portions to each other with a barrel element having first and second dual axis hinge elements coupled to opposing ends. The barrel element has a depression formed between the hinge elements and sized to accept a stylus. The stylus may be held in place by interaction of side walls of the depression against the stylus, such as a compressive force that snaps the stylus in place, or by a biasing device, such as a magnet integrated in the stylus that interacts with ferromagnetic material integrated within the barrel element. In one embodiment, the stylus within the depression interacts with the main housing portion during a portion of available rotational movement so that the stylus is restricted from removal from the depression until at least a minimum rotation of the housing portions has taken place. In another embodiment, a sensor disposed in barrel hinge detects presence or absence of the stylus at the depression to configure a touchscreen display to operate with or without the stylus, such as by adjusting the touchscreen touch detection scan rate or touch resolution.

The present invention provides a number of important technical advantages. One example of an important technical advantage is that a stylus is retained in a protected position within a portable information handling system when not in use. A stylus garage formed within a barrel hinge stores a stylus securely when the information handling system rotates to a closed position and exposes the stylus when the information handling system rotates to an open position. The stylus in the garage is readily visible to the end user when needed and the garage position serves as a reminder to an end user to store the stylus before closing the housing.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A stylus garage integrates into a portable information handling system barrel hinge to stow a stylus with the information handling system closed and expose the stylus for use with the portable information handling system open. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
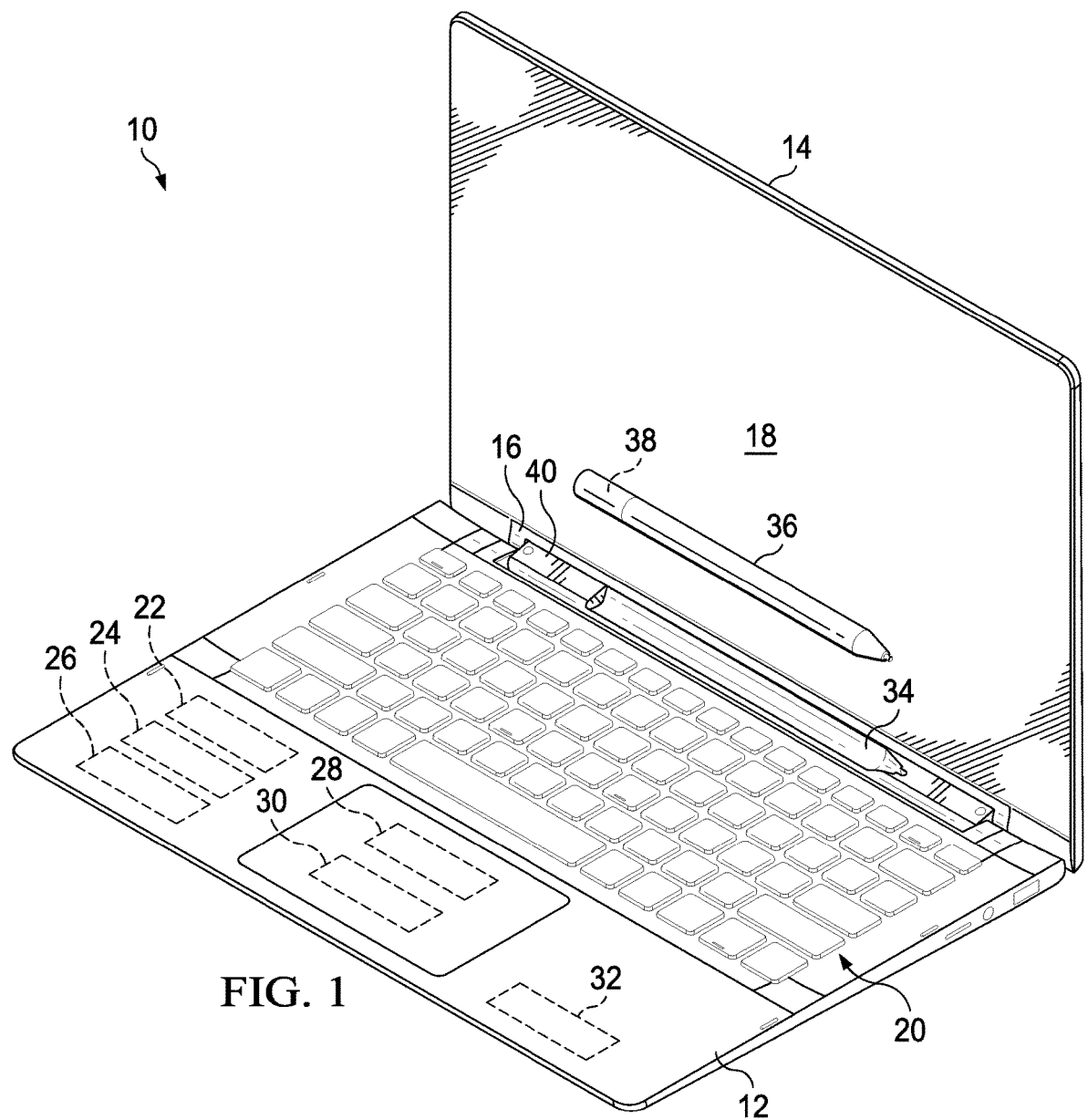
FIG. 1 depicts an information handling system in an open clamshell position having a stylus garage integrated in a barrel hinge.

Referring now to FIG. 1, an information handling system 10 is depicted in an open clamshell position having a stylus garage integrated in a mono barrel hinge 16. Information handling system 10 has a portable configuration built with a main housing portion 12 rotationally coupled to a lid housing portion 14 by mono barrel hinge 16. In the example embodiment, lid housing portion 14 has rotated approximately 90 degrees relative to main housing portion 12 to achieve a clamshell configuration in which a display 18 integrated in lid housing portion 14 is held in a viewing position substantially perpendicular relative to a keyboard 20 integrated in main housing portion 12. In the clamshell configuration, an end user may perform typed inputs at keyboard 20 while viewing display 18. Main housing portion 12 integrates a variety of processing components that cooperate to process information for presentation as visual images at display 18. For example, a central processing unit (CPU) 22 executes instructions to process information with the instructions and information stored in random access memory (RAM) 24. A solid state drive (SSD) provides persistent storage of information during power down of the processing components. For instance, SSD 26 stores the operating system and applications for retrieval at boot to RAM 24. A chipset 28 supports operations of CPU 22, such as with graphics and memory management. An embedded controller 30 provides management of physical components, such as power and input/output (I/O) devices. For example, embedded controller 30 processes keyboard 20 inputs and touch inputs made at a capacitive touch detection layer of display 18, and reports the inputs to CPU 22. A graphics processing unit (GPU) 32 processes information provided from CPU 22 to define visual images for presentation at display 18, such as by sending pixel values to display 18. In various embodiments, various arrangements of processing components may be used in information handling system 10 to achieve desired processing capabilities.

In the example embodiment, mono barrel hinge 16 includes sequential hinge elements so that the barrel rotates in a defined manner relative to the housing portions. For example, a depression 34 formed in hinge 16 to have the shape of a stylus 36 provides a stylus garage for stowing stylus 36 when not in use. Depression 34 rotates as defined by sequential motion of mono barrel hinge 16 so that in the clamshell position depicted by FIG. 1, stylus 36 is exposed to an end user so that the end user may grasp stylus 36 and remove stylus 36 from depression 34 for use as a writing utensil at display 18. In one embodiment, stylus 36 is biased to maintain a position in depression 34 by interaction with side walls that define depression 34. For example, the shape of depression 34 conforms tightly to stylus 36 so that side walls of depression 34 compress against stylus 36 and snap stylus 36 into position. Alternatively or in addition, stylus 36 may integrate a magnet 38 that is attracted to ferromagnetic material of mono barrel hinge 16, such as a steel-based material or a magnet integrated near depression 34. Advantageously, a Hall sensor 40 integrated in mono barrel hinge 16 detects the presence or absence of stylus 36 based upon the proximity of magnet 38 to depression 34. For instance, a scan rate of the touchscreen of display 18 may be adjusted based upon whether stylus 36 is stowed or removed, as may other touchscreen settings that configure touch detection for use with or without stylus 36. As another example, a user interface presented at display 18 by an operating system of information handling system 10 may adjust between stylus-based inputs or typed inputs based upon presence or absence detection of stylus 36. In one example embodiment, detected absence of stylus 36 from depression 34 may set off an alarm in the event the end user seeks to close information handling system 10 without stylus 36 installed in depression 34, such as an audible alarm or a visual alarm at system shutdown. In this manner stylus 36 is less likely to be lost or forgotten after use.

Mono barrel hinge 16 offers several advantages for rotationally coupling main housing portion 12 and lid housing portion 14 with a three-knuckle configuration relative to the use of separate hinge elements in a five knuckle configuration. For example, in thin or low Z portable information handling systems, interconnecting hinge elements with a barrel between them provides robustness with the barrel structure that reduces housing flexure. Sequential motion of mono barrel hinge 16, such as driven by gears or other sequencing mechanisms, ensures an orientation of depression 34 that moves in a predictable manner relative to housing portions 12 and 14. For instance, in the example embodiment at ninety degrees of rotation from a closed position to the depicted clamshell position, depression 34 rotates to fully expose stylus 36. If housing portions 12 and 14 rotate to a closed position having display 18 directly over keyboard 20, depression 34 rotates to face a central location of information handling system 10, effectively locking stylus 36 within information handling system 10. If housing portions 12 and 14 rotate 360 degrees from the closed position to a tablet position having display 18 exposed and keyboard 20 at a bottom location, depression 34 rotates to face outward from the central location so that it is fully exposed to an end user grasp. Similar orientations may be achieved with a synchronized hinge that rotates housing portions 12 and 14 in synchronized manner. In an alternative embodiment, mono barrel hinge 16 may integrate a central barrel support that does not rotate in a sequential or synchronized manner so that the orientation of depression 34 is controlled separate from the rotational positions of housing portions 12 and 14. For instance, depression 34 may couple with independent rotation to an underlying sequential or synchronized hinge or hinge 16 may move in non-sequential or an unsynchronized manner.

Figure 2:
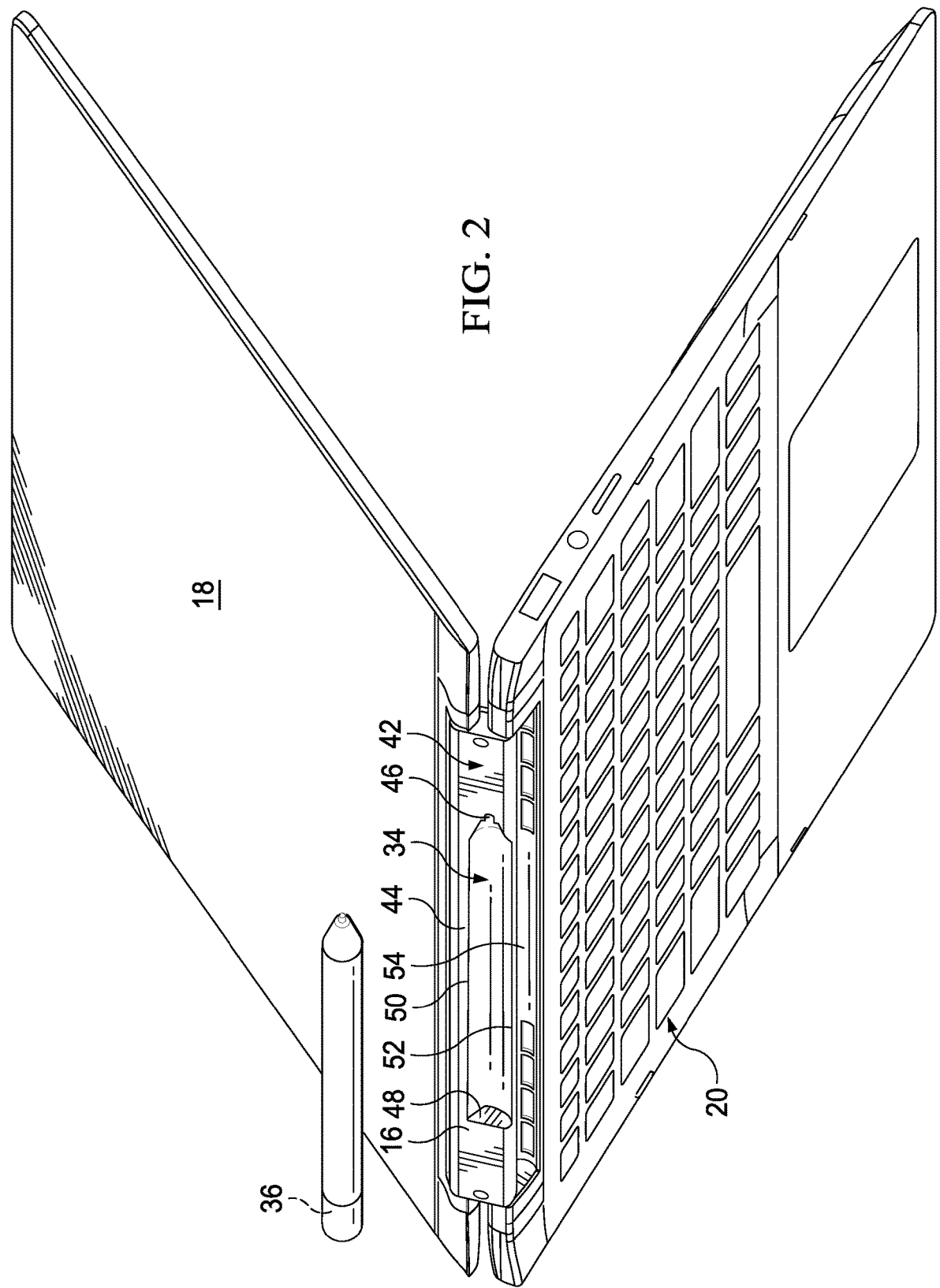
FIG. 2 depicts an information handling system in a tablet tent position having the stylus garage exposed at an upper side.

Referring now to FIG. 2, an information handling system 10 is depicted in a tablet tent position having the stylus garage 34 exposed at an upper surface 42. In the example embodiment, main housing portion 12 has rotated 270 degrees relative to lid housing portion 14 so that information handling system 10 stands on a support surface as a tent having barrel hinge 16 at a top position. Depression 34 has rotated to expose stylus 36 at the top position for ease of grasp by an end user. The end user may readily write with stylus 36 on display 18 while information handling system 10 rests on a support surface. If the end user desires to write on display 18 as a writing pad, the end user may complete rotation of main housing portion 12 under lid housing portion 14 to expose display 18 as a tablet.

In the example embodiment of FIG. 2, depression 34 is formed to have a lower height at a front side wall 52 than at a rear side wall 50. A rear lip 44 formed in upper surface 42 spaces rear side wall 50 from the rear of barrel hinge 16. Stylus 36 is guided into position by a tip end wall 46 that conforms to a writing tip of stylus 36 and a base end wall 48 that conforms to the end of stylus 36 opposite the writing tip. The lower height at front side wall 52 exposes a stylus 36 that is installed in depression 34 to a main housing portion rear side wall 54 so that removal of stylus 36 from depression 34 may be restricted based upon the relative rotational position of barrel hinge 16 to main housing portion 12. For example, a curved edge of main housing portion rear side wall 54 extends over an installed stylus 36 for part of the rotation of the housing portions until a rotational angle is achieved that releases stylus 36 from depression 34. For instance, during rotation from a closed position to approximately forty-five degrees open, main housing portion rear side wall 54 extends over stylus 36 to retain stylus 36 in position. After forty-five degrees of rotation, hinge 16 rotates relative to main housing portion rear side wall 54 to allow removal of stylus 36. In one alternative embodiment, depression 34 may conform laterally to stylus 36 so that a charging pad integrated in base end wall 48 presses up against a charging receptacle in the base of stylus 34 to provide charging when stylus 34 is stowed as well as presence/absence detection of stylus 34.

Figure 3:
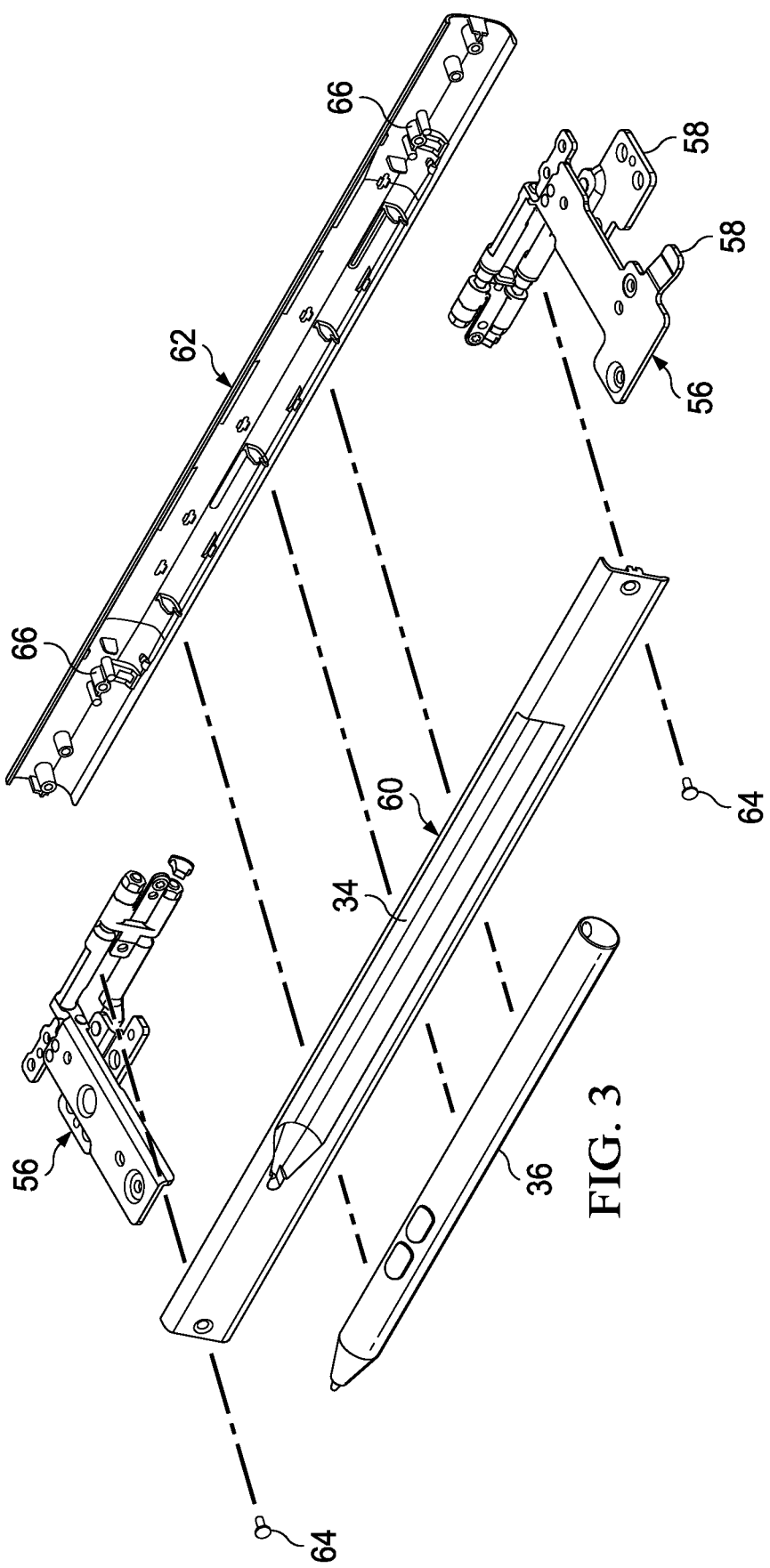
FIG. 3 depicts an exploded side perspective view of a barrel hinge having a stylus garage that accepts a stylus.

Referring now to FIG. 3, an exploded side perspective view depicts a barrel hinge 16 having a stylus garage 34 that accepts a stylus 36. In the example embodiment, first and second sequential dual axis hinge elements 56 integrate at opposing ends of barrel hinge 16 to support 360 degrees of rotational movement of the housing portions relative to each other. A barrel element inner portion 60 has depression 34 formed in it to provide the stylus garage for stowing stylus 36. A barrel element outer portion 62 includes hinge element guides 66 that align hinge elements 56 into place for capture between barrel element 60 and 62. Screws 64 or other coupling devices secure barrel elements 60 and 62 to each other so that hinge elements 56 are captured within the assembled barrel. Each hinge element 56 has first and second brackets 58 that couple to first and second information handling system housing portions. In the example embodiment, communications between the housing portions are supported with wirelines routed through the hinge elements 56 to leave empty the barrel region between hinge elements 56.

Figure 4:
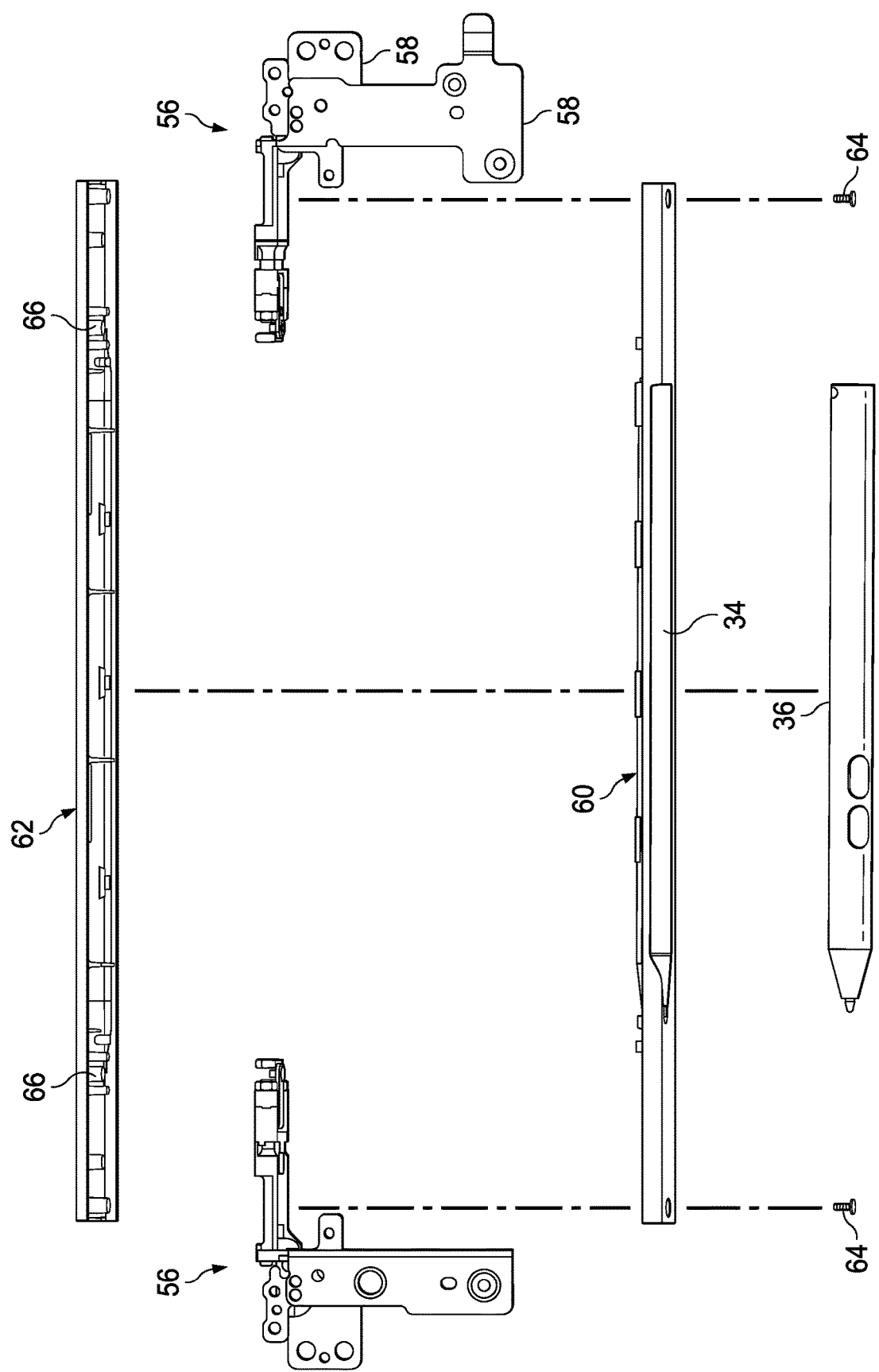
FIG. 4 depicts an exploded top view of a barrel hinge having a stylus garage that accepts a stylus.

Referring now to FIG. 4, an exploded top view depicts a barrel hinge 16 having a stylus garage 34 that accepts a stylus 36. As depicted, hinge elements 56 align with hinge element guides 66 to assemble hinge 16 in correct alignment. Inner barrel element portion 60 and outer barrel element 62 assemble with screws 64 into a barrel that couples hinge elements 56 at opposing ends.

Although the present invention has been described in detail, it should be understood that various changes, substitutions and alterations can be made hereto without departing from the spirit and scope of the invention as defined by the appended claims.

What is claimed is:

1. An information handling system comprising:
   a lid housing portion integrating a display;
   a main housing portion integrating processing components operable to process information, the processing components interfaced with the display to present the information as visual images;
   a mono barrel hinge rotationally coupling the lid housing portion and main housing portion to rotate between closed and open positions, the mono barrel hinge having first and second dual axis hinge elements coupled to each other by a mono barrel member, the mono barrel member forming a depression shaped to accept a stylus, the first and second dual axis hinge elements both disposed in an interior of the mono barrel member, each of the first and second dual axis hinge elements having a first bracket extending out of the mono barrel member to couple to the lid housing portion and a second bracket extending out of the mono barrel interior to couple to the main housing portion; and
   a sensor integrated in the mono barrel hinge and interfaced with the processing components, the sensor operable to detect presence of a stylus in the depression;

wherein the processing components apply a first touch sensitivity to detect touches at the display if the stylus is present and a second touch sensitivity to detect touches at the display if the stylus is not present.

2. The information handling system of claim 1 further comprising:
a stylus having a capacitive tip to input against the display;
wherein the stylus fits into the depression with the lid and main housing portions rotated to a closed position.

3. The information handling system of claim 2 further comprising:
a magnet integrated in the stylus; and
ferromagnetic material integrated in the depression, a magnetic attraction between the magnet and ferromagnetic material biasing the stylus into the depression.

4. The information handling system of claim 2 wherein the depression conforms against the stylus to maintain the stylus in the depression.

5. The information handling system of claim 1 wherein touch sensitivity comprises a touch detection scan rate of the display.

6. The information handling system of claim 1 wherein the mono barrel member comprises:
an inner member disposed proximate the display and having the depression;
an outer member disposed distal the display and having positioning guides for aligning the first and second hinge elements; and
one or more coupling devices to couple the inner member to the outer member with the first and second hinge elements captured between the inner member and outer member.

7. The information handling system of claim 6 wherein the inner member further comprises:
a first sidewall defining the depression proximate the display; and
a second sidewall defining the depression proximate a keyboard integrated in the main housing portion, the first sidewall taller than the second sidewall.

8. The information handling system of claim 7 wherein the second sidewall cooperates with the main housing portion to restrict removal of the stylus from the depression until the lid and main housing portions rotate greater than a predetermined angle.

9. A method for using a stylus with an information handling system, the method comprising:
rotating first and second housing portions to an open position that exposes a depression formed in a barrel hinge, the barrel hinge rotationally coupling the first and second housing portions to each other with first and second dual axis hinge elements disposed in an interior of a barrel member, each of the first and second dual axis hinge elements having first and second brackets extending out of the interior to couple with the first and second housing portions;
placing the stylus in the depression;
rotating the first and second housing portions to a closed position that encloses the depression within the first and second housing portions to retain the stylus in the depression;
sensing presence or absence of the stylus in the depression;
applying a first touch detection sensitivity at a display of the information handling system if the stylus is present;
applying a second touch detection sensitivity at the display if the stylus is absent; and
detecting touches at the display with each of the first and second touch detection sensitivity.

10. The method of claim 9 further comprising retaining the stylus within the depression by magnetic attraction between the stylus and barrel hinge.

11. The method of claim 9 further comprising retaining the stylus within the depression by engagement of the stylus against the sides of the depression.

12. The method of claim 9 further comprising:
retaining the stylus in the depression through a first range of angular relationship of the first and second housing portions by engagement of the stylus against the first housing portion; and
releasing the stylus from the depression through a second range of angular relationship of the first and second housing portions by disengagement of the stylus from the first housing portion.

13. The method of claim 9 wherein the first housing portion integrates a keyboard, the second housing portion integrates a display and the depression sidewall proximate the keyboard exposes the stylus to selectively engage against the first housing portion through a predetermined range of rotational movement.

* * * * *